Patented Jan. 2, 1923.

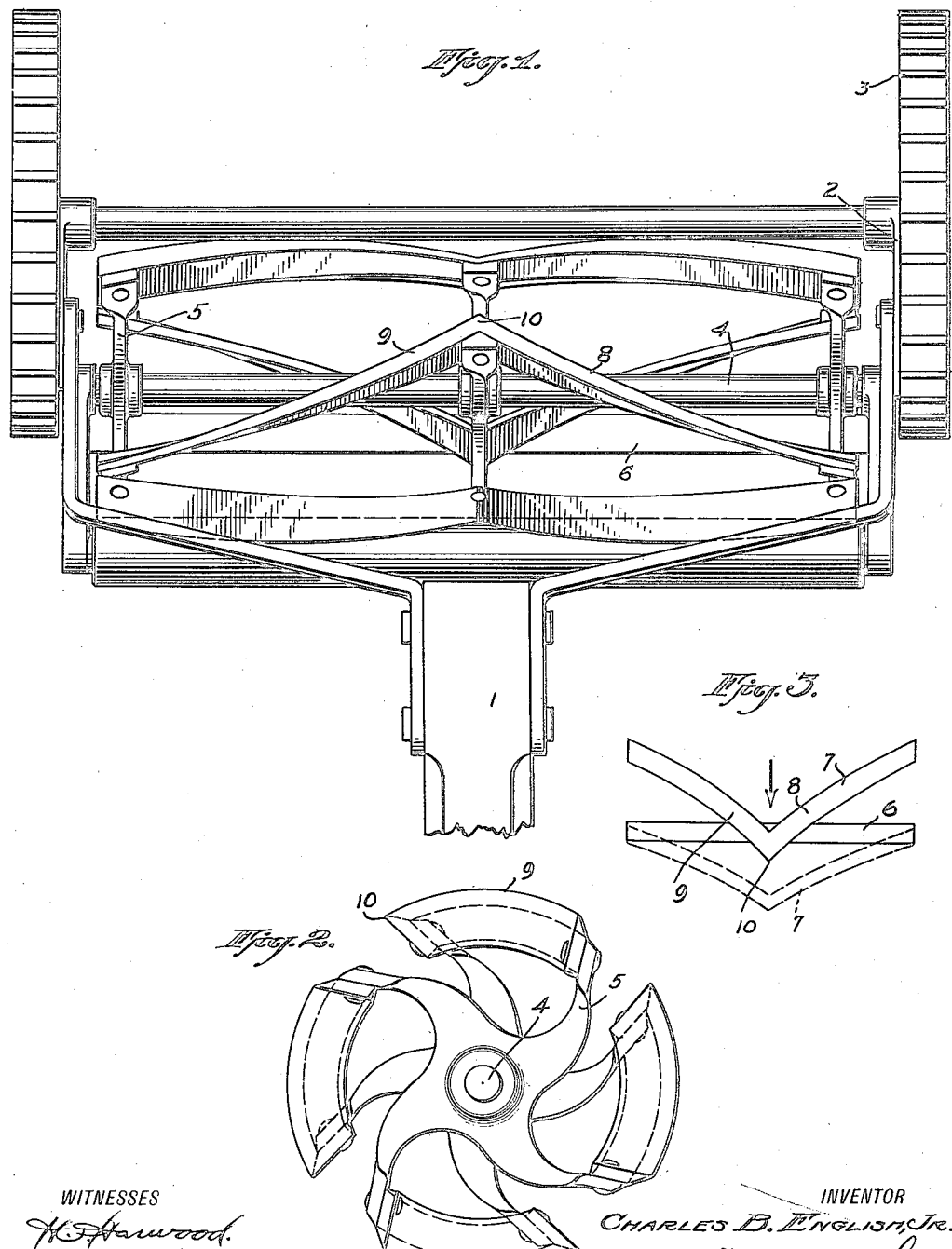

1,441,073

UNITED STATES PATENT OFFICE.

CHARLES B. ENGLISH, JR., OF PAULSBORO, NEW JERSEY.

LAWN-MOWER CUTTER.

Application filed April 1, 1921. Serial No. 457,796.

*To all whom it may concern:*

Be it known that I, CHARLES B. ENGLISH, Jr., a citizen of the United States, and a resident of Paulsboro, in the county of Gloucester and State of New Jersey, have invented a new and Improved Lawn-Mower Cutter, of which the following is a full, clear, and exact description.

This invention relates to cutters and particularly to an improved cutter for lawn mowers and has for an object to provide a construction which works in a very efficient manner without requiring any unusual attention.

Another object of the invention is to provide a cutter for lawn mowers in which the cutting blades are so formed as to overlap the cutting bar at two points to a sufficient extent to allow the succeeding blade to engage the bar before the preceding one has left the same, whereby injury to the blade and noise is prevented.

In the accompanying drawing—

Figure 1 is a top plan view of a lawn mower constructed with blades embodying the invention applied thereto.

Figure 2 is an end view of the entire cutter shown in Figure 1.

Figure 3 is a diagram showing how the cutting blades pass over the cutting bar.

Referring to the accompanying drawing by numerals, 1 indicates a handle of any desired kind which is connected in any suitable manner with what may be termed a body or frame 2 of the lawn mower. Suitable wheels 3 are provided and other suitable mechanism now in common use for rotating the cutter shaft 4. The parts just named are all well known and are illustrated merely to bring out more clearly how the cutter 5 is constructed and how the same acts with the cutter bar 6. The cutter bar 6 is adjustable toward and from the cutter 5 in the usual manner but the construction of the cutter 5 is different from the cutters heretofore provided, said difference being in the formation of the various blades 7 which blades are formed into sections 8 and 9 merging at a point 10. The sections 8 and 9 of the blades 7 are sufficiently converge to cause the point 10 of one blade to engage the cutter bar 6 before the preceding blade has left the cutter bar whereby there is a continuous contact of cutters with the cutter bar.

By reason of this construction the cutters may be adjusted to operate very close to the cutter bar 6 and even scrape against the same without undue friction and without any noise. Heretofore, a certain allowance had to be made for the condition of the bearings of the cutter 5 or rather of the bearings of the shaft 4 in order to permit the cutting blades to pass the cutting bar. Quite often the adjustment was irregular or rather more on one side than the other and, consequently, each cutter blade would first strike the cutter bar and then pass over the same. This old method fails to produce a silent machine when the bearings become loosened through wear or from other causes by reason of the point of support being at a distance from the point where the approaching blade meets the cutter bar. This is usually equal to almost the entire length of the bar. This action causes one end of the seating blade to drop below the cutter bar and, therefore, instead of sliding smoothly onto the cutting bar it will first strike violently against it and then slide over in the usual manner. This bang or violent striking produces the usual clatter which is common to lawn mowers now in use especially to lawn mowers which are rather old and the bearings worn.

In the present construction, the arrangement of the blades prevents this banging or striking action because the cutter blades are supported at both ends by contact with the cutter bar due to the shape of the cutters, said supporting action continuing until the blade following has overlapped the cutter bar. In view of this arrangement of support against the cutter bar, clattering will be prevented.

By forming the cutter blades as shown in the drawing a satisfactory adjustment may be made and also the blades will operate properly regardless of whether or not the bearings are worn. In fact, the bearings could be extremely loose and the parts adjusted to take care of this condition or springs can be provided acting on the shaft 4 for holding the cutter blades against the cutter bar 6. It will be noted that by the overlapping of the blades on the bar 6, no clattering can be produced while at the same time a good shearing action is provided.

What I claim is:—

In a lawn mower of the character described a cutting bar and a rotary cutter provided with a plurality of unitary V shaped cutter blades arranged so that the apex of one blade overlaps said cutting bar before the ends of the preceding blade leaves the said bar.

CHARLES B. ENGLISH, Jr.